United States Patent
Jang et al.

(10) Patent No.: US 10,710,475 B2
(45) Date of Patent: Jul. 14, 2020

(54) SEAT RAIL FOR VEHICLE

(71) Applicant: HYUNDAI DYMOS INCORPORATED, Seosan-si, Chungcheongnam-do (KR)

(72) Inventors: Jae Yong Jang, Suwon-si (KR); Cheon Kim, Hwaesong-si (KR)

(73) Assignee: HYUNDAI DYMOS INCORPORATED, Seosan-si (KR)

( * ) Notice: Subject to any disclaimer, the term of this patent is extended or adjusted under 35 U.S.C. 154(b) by 0 days.

(21) Appl. No.: 16/211,001

(22) Filed: Dec. 5, 2018

(65) Prior Publication Data
US 2019/0193595 A1    Jun. 27, 2019

(30) Foreign Application Priority Data
Dec. 26, 2017 (KR) .......................... 10-2017-0180219

(51) Int. Cl.
*B60N 2/08* (2006.01)
*B60N 2/07* (2006.01)

(52) U.S. Cl.
CPC ......... *B60N 2/0843* (2013.01); *B60N 2/0727* (2013.01); *B60N 2/0806* (2013.01); *B60N 2/0875* (2013.01); *B60Y 2306/09* (2013.01)

(58) Field of Classification Search
CPC .. B60N 2/0843; B60N 2/0727; B60N 2/0806; B60N 2/0875

USPC ....................................... 296/65.13; 248/429
See application file for complete search history.

(56) References Cited

U.S. PATENT DOCUMENTS

| | | | | |
|---|---|---|---|---|
| 5,028,028 A * | 7/1991 | Yamada | ................. | B60N 2/071 248/430 |
| 6,354,553 B1 * | 3/2002 | Lagerweij | ............ | B60N 2/0715 248/429 |
| 6,435,465 B1 * | 8/2002 | Yamada | ................. | B60N 2/071 248/429 |
| 7,503,614 B2 * | 3/2009 | Yamada | ............... | B60N 2/0705 296/65.13 |

FOREIGN PATENT DOCUMENTS

| | | |
|---|---|---|
| KR | 20110013663 | 2/2011 |
| KR | 20160083211 | 7/2016 |
| KR | 101716985 | 3/2017 |

* cited by examiner

*Primary Examiner* — Joseph D. Page
(74) *Attorney, Agent, or Firm* — Burris Law, PLLC

(57) ABSTRACT

The present disclosure relates to a seat rail for a vehicle having a lever shaft configured to be integrally combined with bracket flanges, whereby shaking of a release lever in the forward/backward and leftward/rightward directions may be reduced. When the release lever is rotated in a restoring direction thereof by an elastic force of a lever spring, lever flanges make contact with a locking mounting bracket and a restoring rotation of the release lever stops. In addition, an end portion of the lever spring may be held by and fixed to the release lever so as to improve operability of a locking pin.

6 Claims, 9 Drawing Sheets

SEAT RAIL FOR VEHICLE

CROSS-REFERENCE TO RELATED APPLICATIONS

This application claims priority to and the benefit of Korean Patent Application No. 10-2017-0180219, filed on Dec. 26, 2017. The disclosure of the above application is incorporated herein by reference.

FIELD

The present disclosure generally relates to a seat rail for a vehicle, in which shaking of the release lever and operational noise of the release lever is reduced.

BACKGROUND

The statements in this section merely provide background information related to the present disclosure and may not constitute prior art.

Generally, a seat for a vehicle is configured to slidably move in forward/rearward directions of a vehicle by using a seat rail. As shown in FIGS. 1 to 4B, the seat rail extends in the forward/rearward directions and includes a fixed rail 1 provided to be fixed to a floor panel in the vehicle and a moving rail 2 combined with the fixed rail 1 to slidably move along a longitudinal direction of the fixed rail 1.

Furthermore, the seat rail includes a locking apparatus so as to restrict movement of the moving rail 2 in the forward/rearward directions. The locking apparatus includes an electric-powered type operated by power of a motor and a manual type manipulated by a user.

As a kind of a manual type, a locking pin type realizing a more precise operation as multiple locking pins operate independently, as shown in the drawings, includes a locking mounting bracket 3, a release lever 4, a lever shaft 5, a lever spring 6, a guide bracket 7, multiple locking pins 8, and one locking pin spring 9 provided per each of the locking pins 8.

The locking mounting bracket 3 is combined on an upper surface of the moving rail 2 so as to be fixed thereto and includes opposing bracket flanges 3a provided thereon when the locking mounting bracket 3 is combined with the moving rail 2, the bracket flanges protruding from an outer side of the moving rail 2 in a side direction thereof and being spaced apart from each other in the forward/rearward directions.

The release lever 4 is positioned between the bracket flanges 3a, wherein the lever shaft 5 integrally passes through the opposing bracket flanges 3a and the release lever 4 in the forward/rearward directions and is combined therewith, and the lever spring 6 is wound on the lever shaft 5, a first end of the lever spring 6 being supported by the locking mounting bracket 3 and a second end thereof being supported by the release lever 4.

The release lever 4 includes a manipulation part 4a and an operation part 4b contacting with the locking pin 8. The manipulation part 4a protruding to an outer side of the seat rail relative to the lever shaft 5 is manipulated by a worker. The operation part 4b passes through the moving rail 2, and an end portion of the operation part 4b is positioned in the moving rail 2, and contacts with the locking pin 8 so as to move the locking pin 8 during the manipulation of the manipulation part 4a.

When a user presses down the release lever 4, the lever spring 6 is compressed, and when the release lever 4 being pressed down is released, the release lever 4 is restored to an initial position thereof by a restoring force of the lever spring 6.

The guide bracket 7 is an L-shaped bracket, a first end thereof being combined with an inner side surface of one side portion of the moving rail 2 so as to be fixed thereto and a second thereof being provided so as to pass through an inner space of the moving rail 2 in leftward/rightward directions of the seat rail.

The multiple locking pins 8 are arranged in a row in the forward/rearward directions, and each of the locking pins 8 is provided to integrally pass through the fixed rail 1, the guide bracket 7, the moving rail 2, and the locking mounting bracket 3 in a vertical direction and to move vertically. Opposite ends of the locking pin spring 9 are provided to be supported by the retainer 10 and a locking pin flange 8a.

The retainer 10 is provided on an inner side of the upper surface of the moving rail 2, and the locking pin flange 8a is provided to be integral to the locking pin 8.

However, as for a conventional seat rail, each of the bracket flanges 3a with which the lever shaft 5 is combined is cut on a side thereof in an upward direction so as to have an open hole 3b. Though the open hole 3b is configured to combine the lever shaft 5 with the bracket flange 3a, shaking of the release lever 4 increases due to the open hole 3b during the manipulation of the release lever 4, and as the shaking of the release lever 4 increases, the operability of the locking pin 8 deteriorates.

In addition, the moving rail 2 includes a window 11 provided on one side wall 2a thereof, and the operation part 4b of the release lever 4 is provided by passing through the window 11. As for the conventional seat rail, as a lower surface of the operation part 4b directly contacts with a lower surface 11a of the window 11 during manipulation of the release lever 4, a contact section is widely distributed, whereby operational noise is loud.

As shown in FIG. 1, when the manipulation part 4a of the release lever 4 is pressed down and released, the release lever 4 is restored to the initial position thereof as shown in FIG. 1 by the restoring force of the lever spring 6. In this case, the lower surface of the operation part 4b of the release lever 4 directly contacts with the lower surface 11a of the window 11 and noise occurs.

A reference number D1 shown in FIGS. 4A to 4B is a horizontal width of the operation part 4b, and as the entirety of the horizontal width D1 of the operation part 4b directly contacts with the lower surface 11a of the window 11, the contact section is widely distributed, and a loud operational noise occurs.

Furthermore, the second end of the lever spring 6 is configured to be supported by the release lever 4, and the conventional release lever 4 does not have a structure which the second end of the lever spring 6 is held in and fixed to. Accordingly, since the release lever 4 cannot be stably provided by the lever spring 6, the shaking of the release lever 4 increases during the manipulation of the release lever 4, and as the shaking of the release lever 4 increases, operability of the locking pin 8 deteriorates.

SUMMARY

The present disclosure provides a seat rail for a vehicle that includes a release lever and a locking pin that reduces shaking of the release lever so as to improve operability of the locking pin by the release lever.

Furthermore, the present disclosure provides a seat rail for a vehicle, wherein when the release lever is manipulated and restored to an initial position thereof, the release lever contacts with and is stopped by a locking mounting bracket, and in this case, as an area of a contact section of the release lever is reduced, operational noise can be considerably improved.

In addition, the present disclosure provides a seat rail for a vehicle, wherein an end portion of a lever spring is configured to be fixed to the release lever by being held in the release lever, whereby the release lever can be stably installed by the lever spring, and during manipulation of the release lever, the shaking of the release lever is reduced so as to improve operability of the locking pin by the release lever.

According to one aspect of the present disclosure, there is provided a seat rail for a vehicle, the seat rail including: a locking mounting bracket being fixed on a moving rail and having a pair of bracket flanges provided thereon, the bracket flanges being spaced apart from each other in forward/rearward directions of the vehicle; and a release lever being combined with the pair of bracket flanges therebetween so as to be elastically rotated by a lever shaft and a lever spring, wherein the lever shaft is integrally combined with each of the bracket flanges by passing through the bracket flanges such that the lever shaft cannot move in forward/backward and leftward/rightward directions during a manipulation of the release lever.

The bracket flange may include a shaft hole provided thereon through which the lever shaft passes in the forward/rearward directions, an edge of the shaft hole being blocked by the bracket flange so as not to communicate with an outside, and the lever shaft may include a head part having a diameter larger than the shaft hole and a press part provided on a first end and a second end thereof, respectively such that the lever shaft is integrally combined with the bracket flanges.

The release lever may include lever flanges provided on opposite side portions thereof in the forward/rearward directions, each of the lever flanges being bent in an upward direction, wherein the lever flange may be positioned on an inner side surface of the bracket flange so as to overlap with the bracket flange, the lever shaft may be integrally combined with the bracket flanges by passing through the pair of bracket flanges and the pair of the lever flanges. The lever spring may be combined with the lever shaft such that a first end and a second end of the lever spring are supported by the locking mounting bracket and the release lever, respectively, when the lever spring is wound on the lever shaft, and the release lever may be combined with the lever shaft so as to elastically rotate relative to the lever shaft.

The lever flange may be positioned between a manipulation part and an operation part of the release lever, and when the release lever is rotated in a restoring direction thereof by an elastic force of the lever spring, the lever flange may contact the locking mounting bracket and rotation of the release lever may stop.

The moving rail may include a window provided on one side wall thereof, and the operation part of the release lever may be provided by passing through the window, wherein when the lever flange stops the rotation thereof by contacting with the locking mounting bracket, the operation part of the release lever may be positioned in a space between an upper surface of the window and a lower surface thereof.

The release lever may include an insertion hole into which the second end of the lever spring is inserted, and a fixing hole which the second end of the lever spring is held in and fixed to, the insertion hole and the fixing hole being connected to each other by a connection hole.

A stop step may be provided between the insertion hole and the fixing hole so that the second end of the lever spring held in the fixing hole may not move to the insertion hole.

According to the seat rail for a vehicle of the present disclosure, the lever shaft is configured to be integrally combined with the bracket flanges, whereby during manipulation of the release lever, a shaking of the release lever in the forward/backward and leftward/rightward directions is reduced and due to the decrease of the shaking of the release lever, operability of the locking pin is improved.

In addition, according to the seat rail for a vehicle of the present disclosure, when the release lever is rotated in a restoring direction thereof by the elastic force of the lever spring, the lever flange first contacts with the locking mounting bracket and a rotation of the release lever stops. Accordingly, the operation part of the release lever is positioned in the space between the upper surface of the window and the lower surface thereof. Accordingly, the lower surface of the operation part of the release lever is inhibited from contacting with the lower surface of the window, whereby a contact area of the release lever can be reduced, and operational noise can be considerably decreased.

Furthermore, according to the seat rail for a vehicle of the present disclosure, the structure of the insertion hole, the connection hole, the fixing hole, and the stop step provided on the release lever are used to hold the second end of the lever spring in the fixing hole. Accordingly, the release lever can be stably installed by the lever spring and during manipulation of the release lever, a shaking of the release lever can be reduced, whereby operability of the locking pin by the release lever can be improved.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
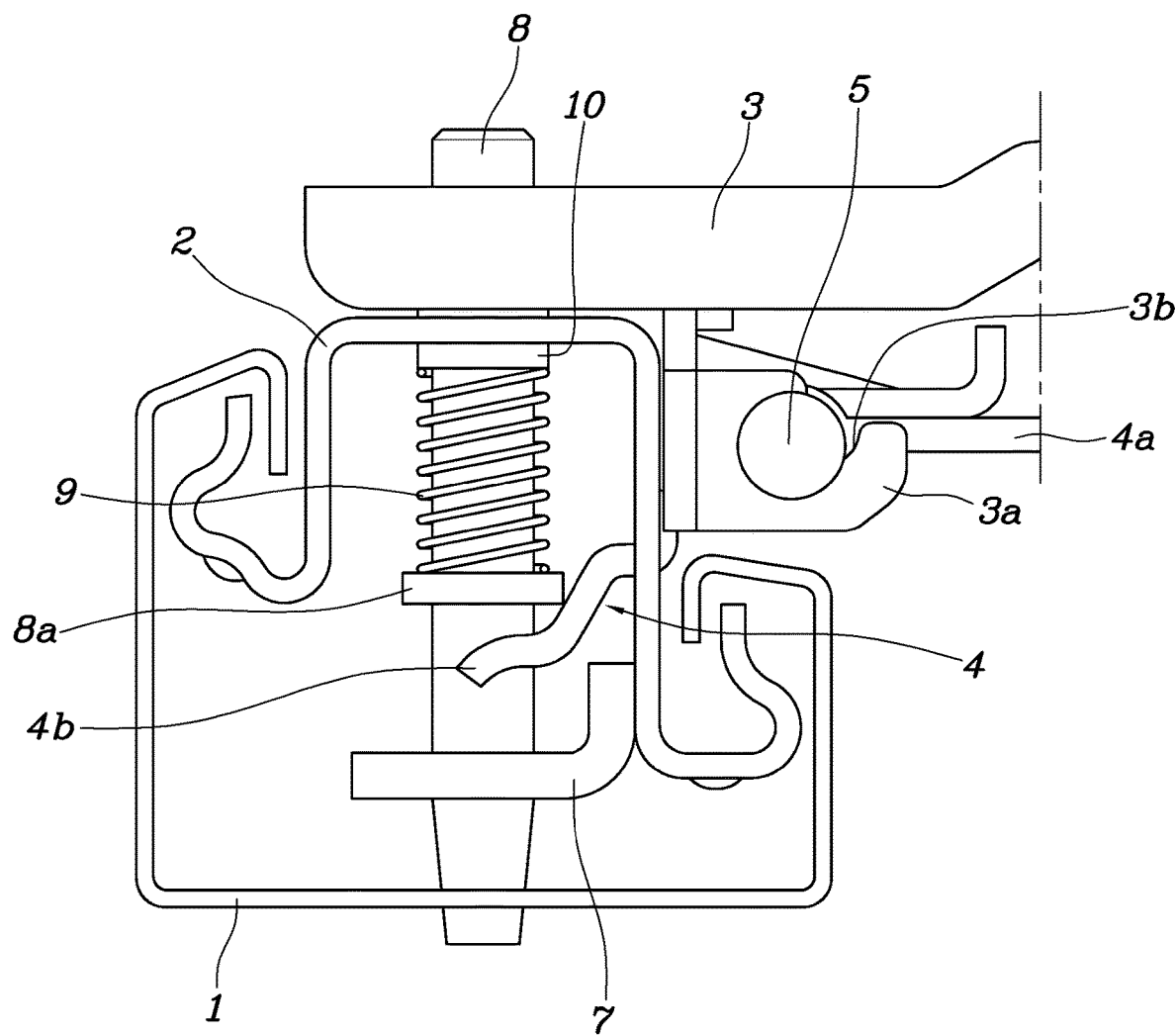
FIG. 1 is a front view illustrating a conventional seat rail.
Figure 2:
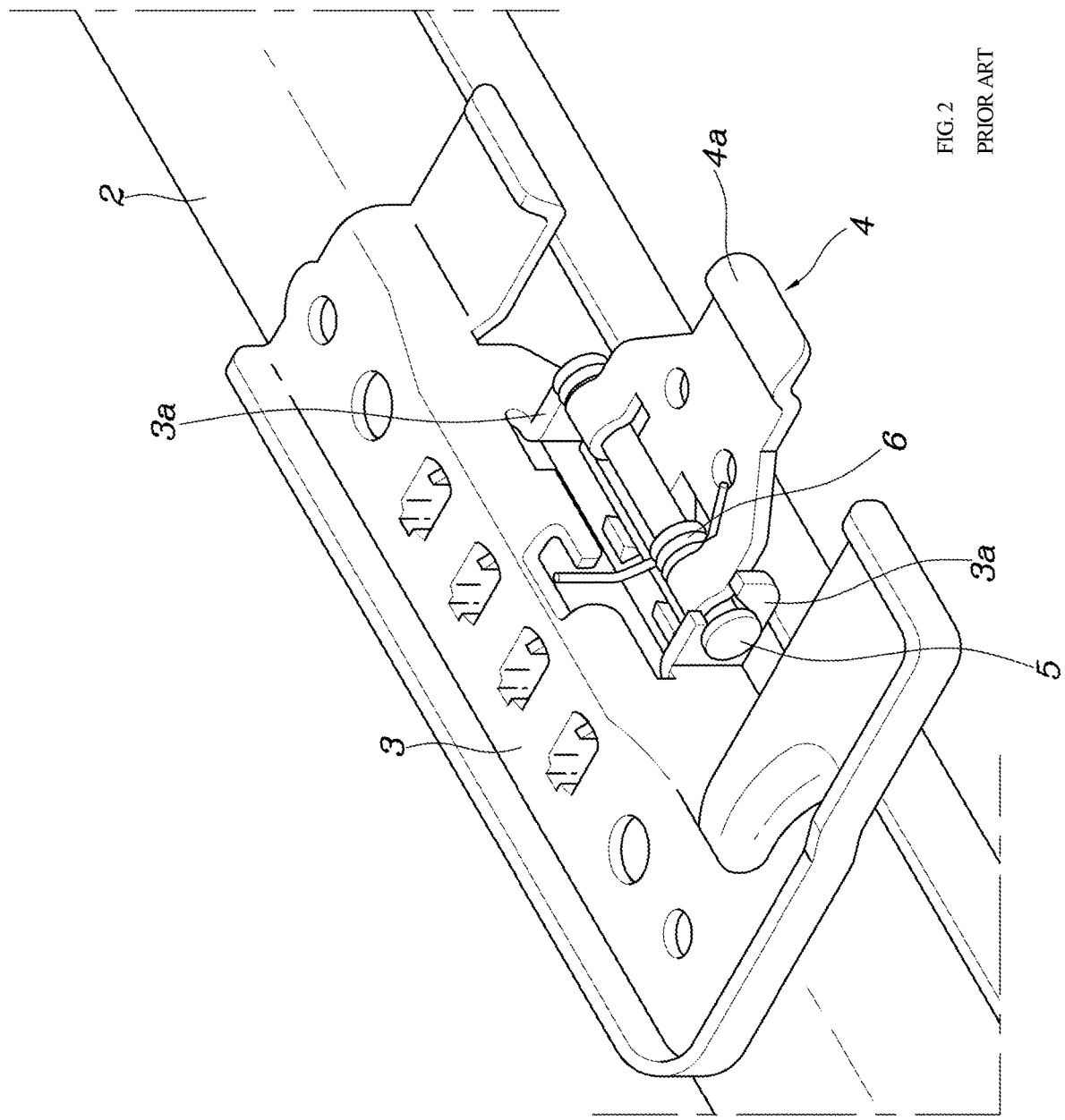
FIG. 2 is a perspective view illustrating a state at which a fixed rail and a locking pin are removed from the seat rail of FIG. 1.
Figure 3:
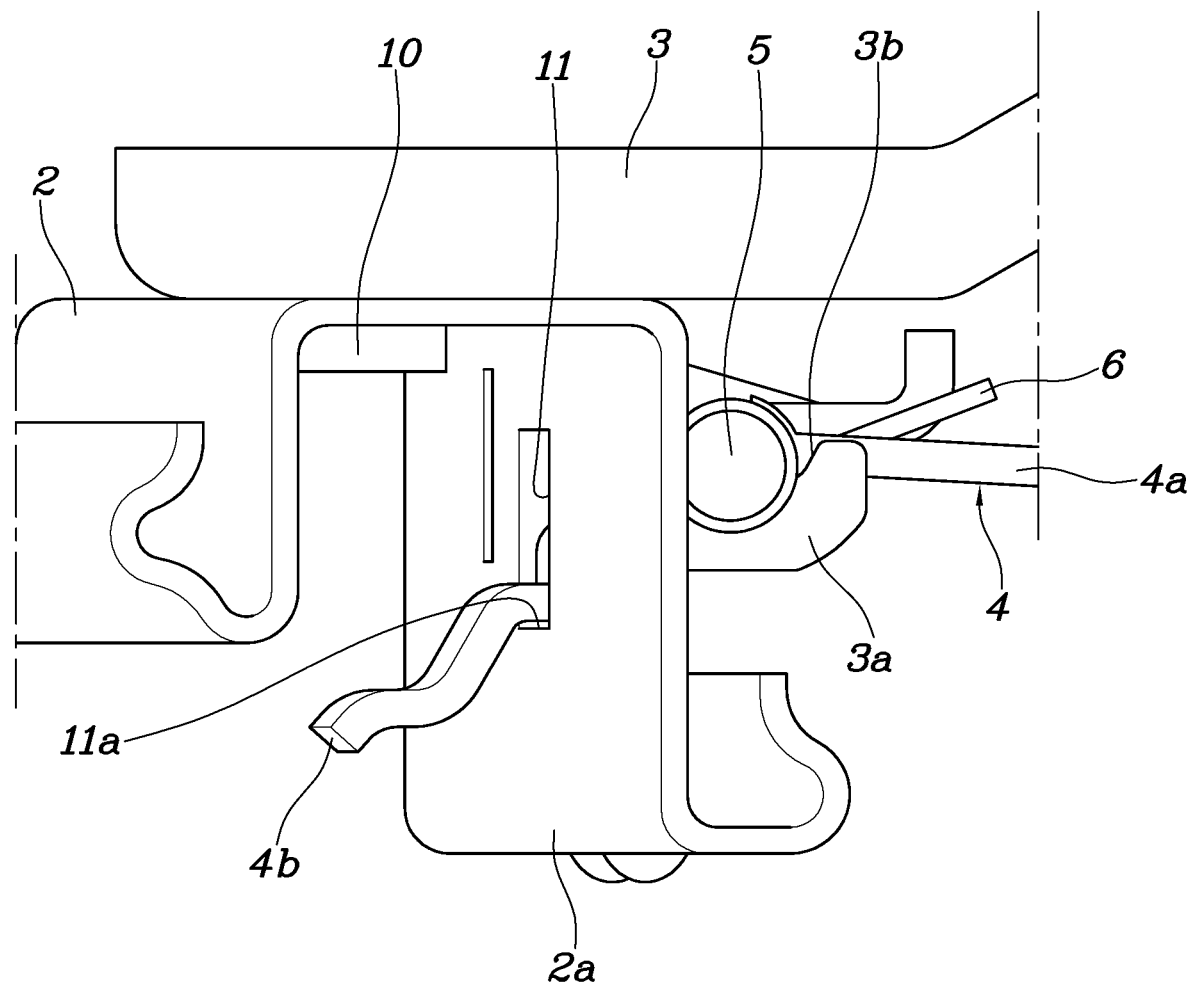
FIG. 3 is a front view illustrating a state at which a fixed rail and a locking pin are removed from the seat rail of FIG. 1.
Figure 4B:
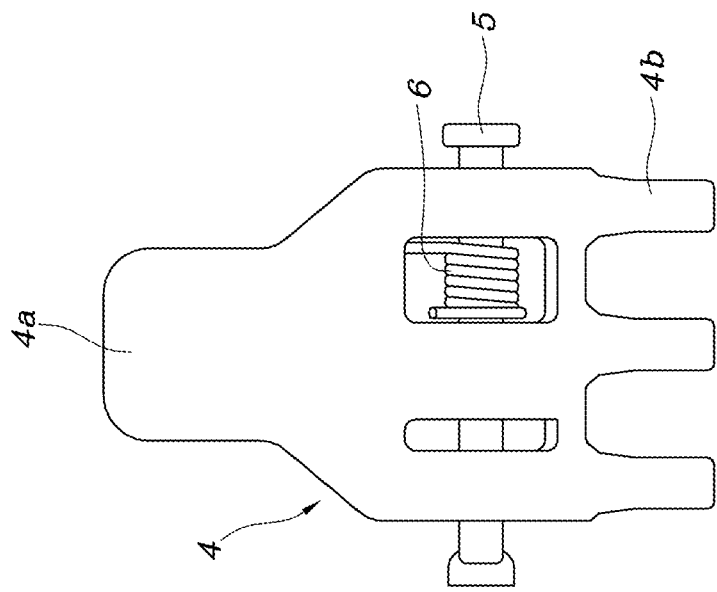
FIG. 4B is a top plan view illustrating a conventional release lever.
Figure 4A:
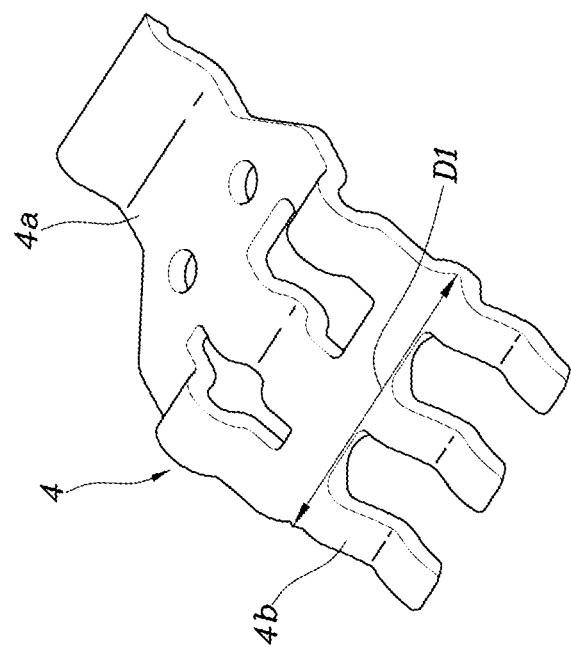
FIG. 4A is a perspective view illustrating a conventional release lever.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinbelow, exemplary forms of the present disclosure will be described in detail with reference to the accompanying drawings.

Figure 5:
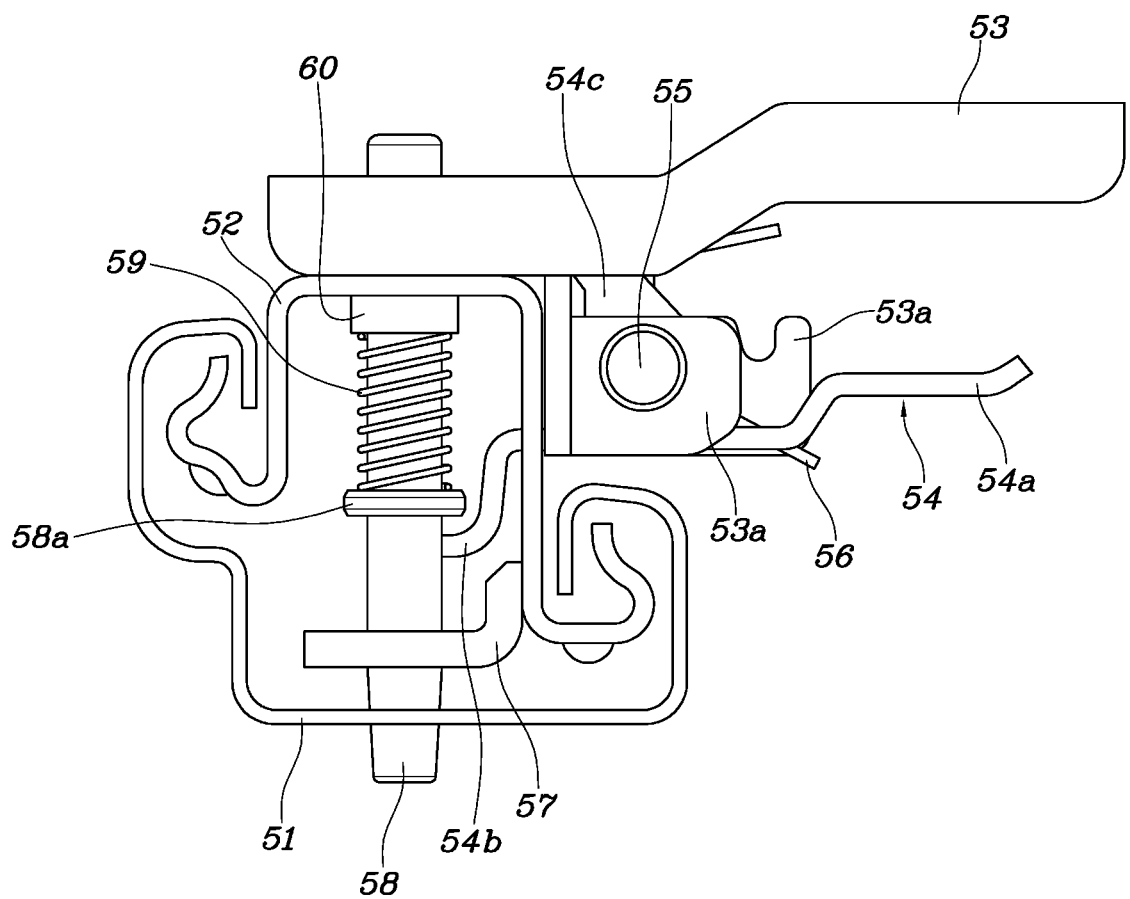
FIG. 5 is a front view of a seat rail according to the present disclosure.
Figure 6:
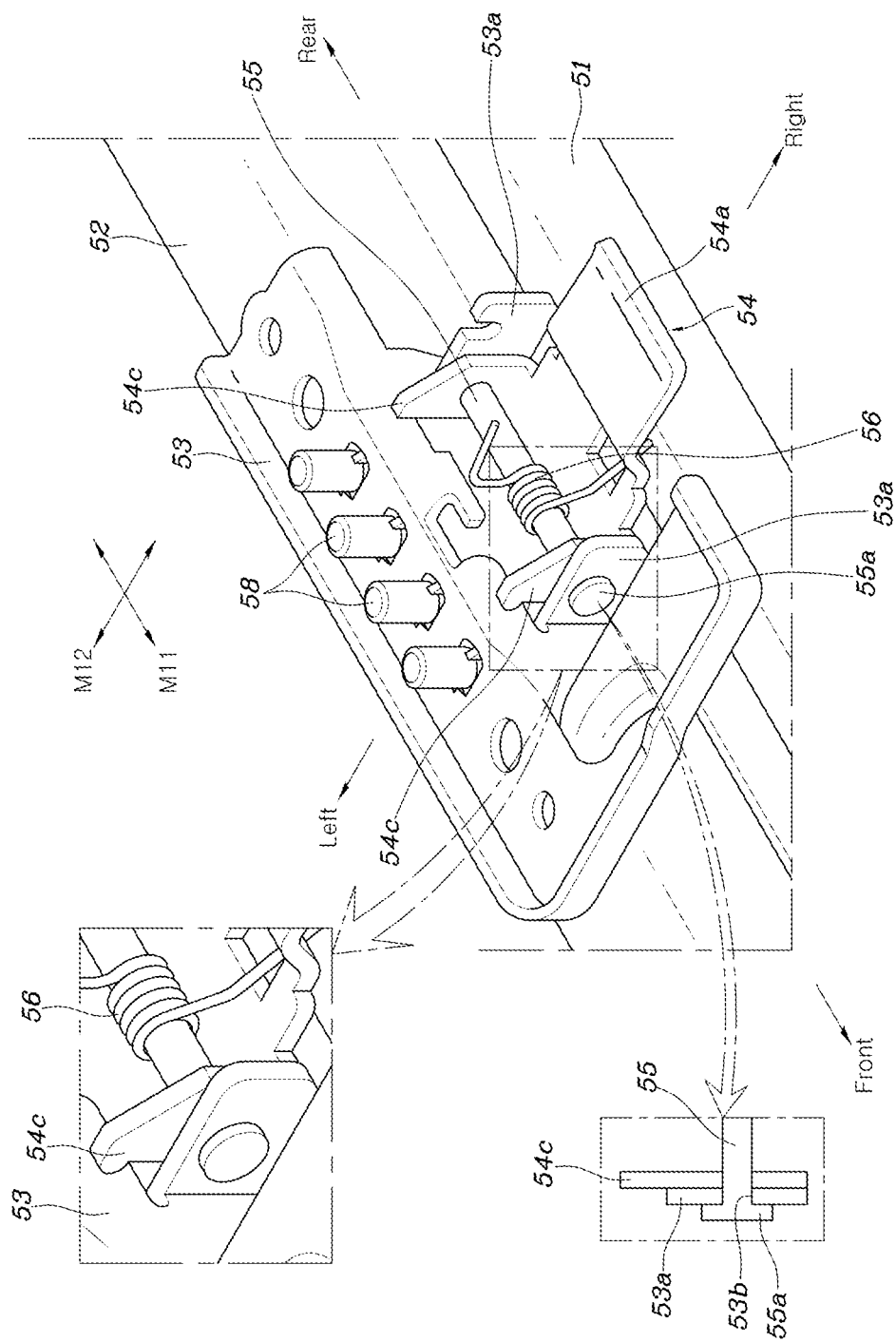
FIG. 6 is a perspective view illustrating the seat rail according to the present disclosure.
Figure 7:
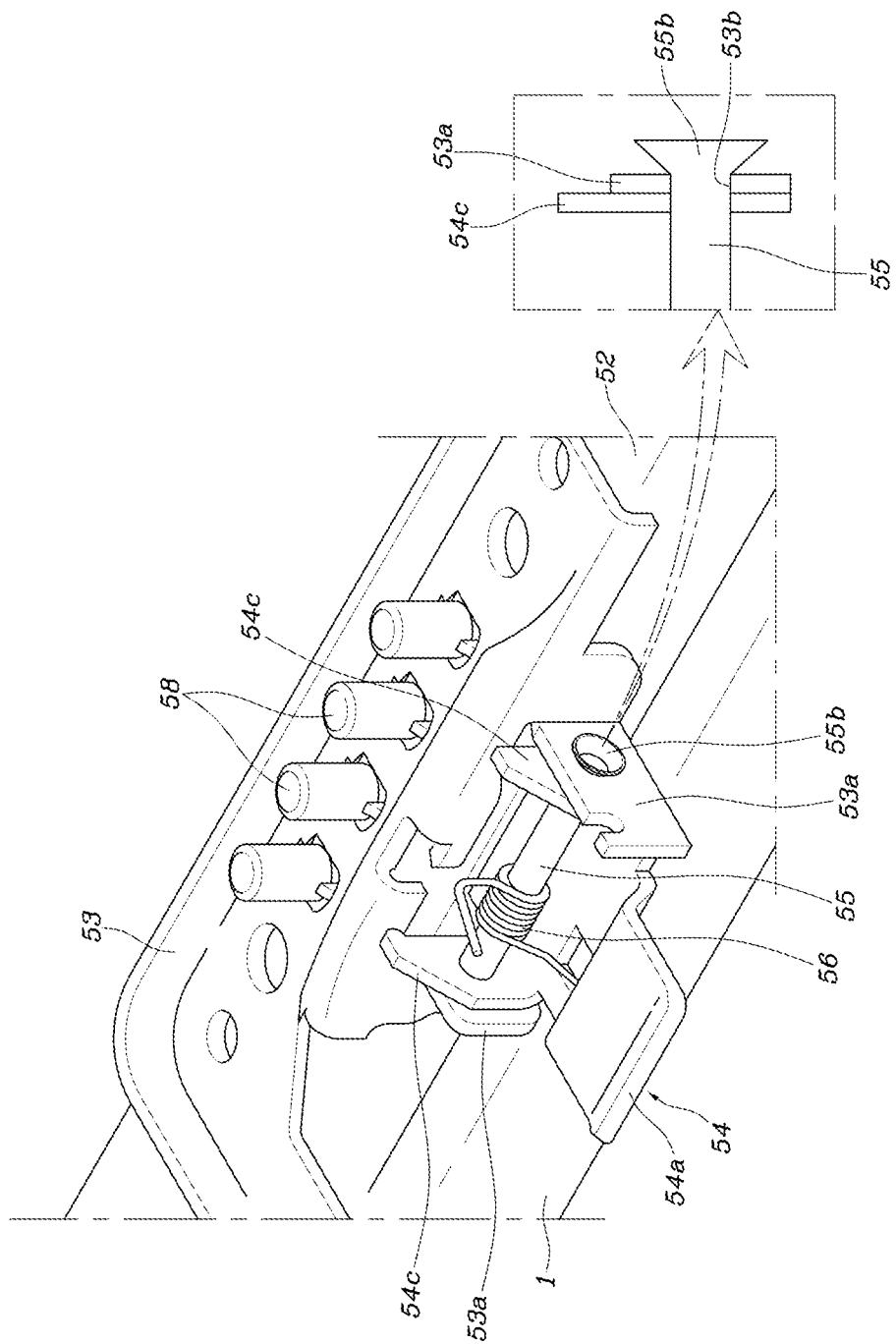
FIG. 7 is a perspective view illustrating the seat rail according to the present disclosure.
Figure 8:
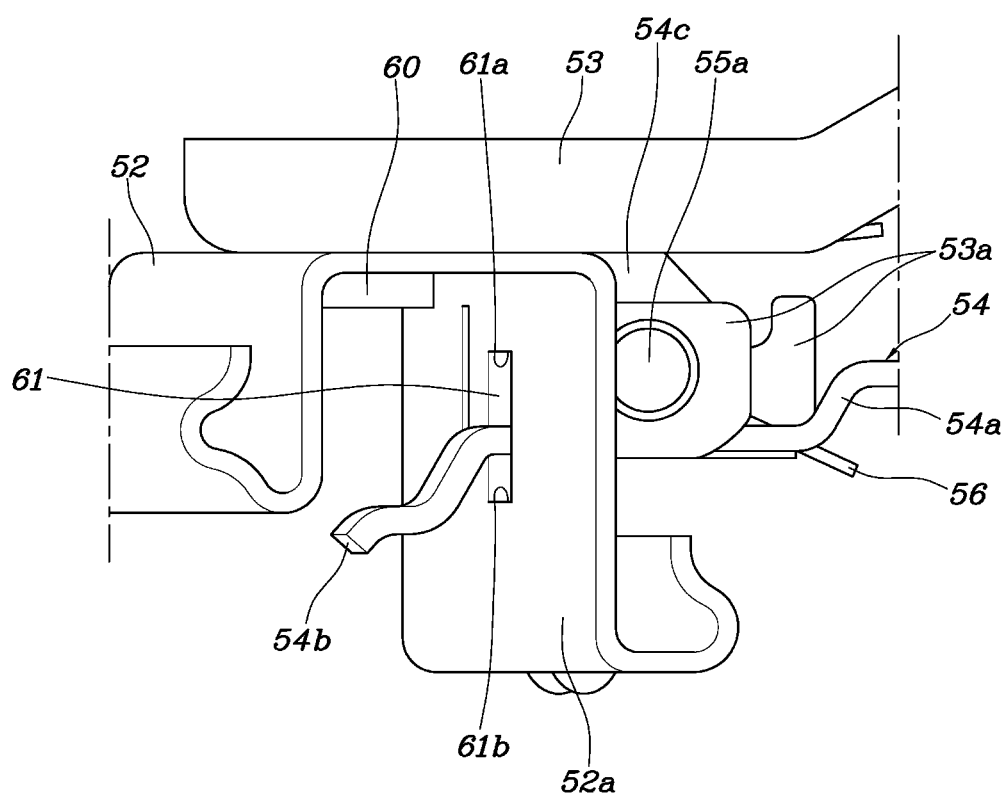
FIG. 8 is a front view illustrating a state at which a fixed rail and a locking pin are removed from the seat rail of FIG. 5.
Figure 9B:
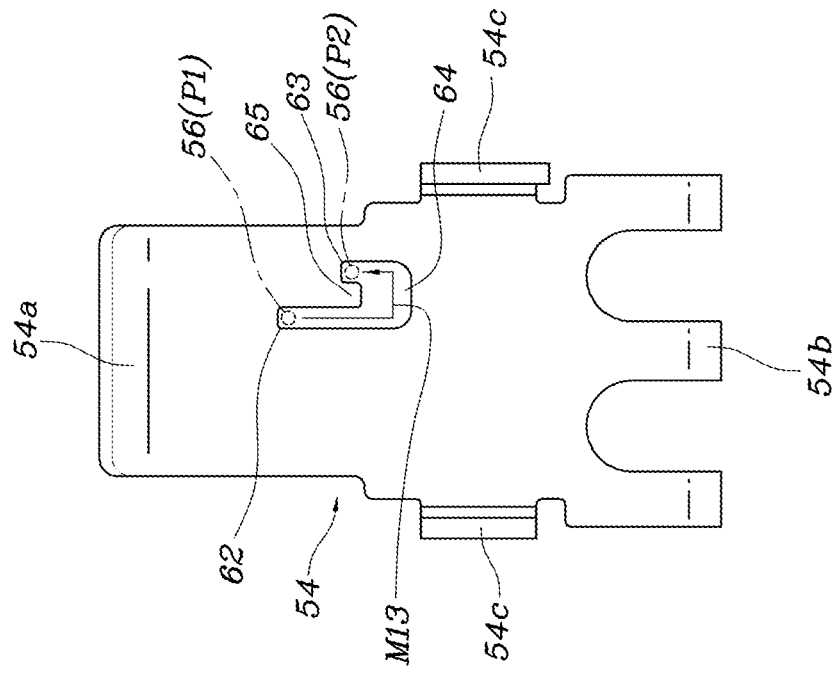
FIG. 9B is a top plan view illustrating a release lever according to the present disclosure.
Figure 9A:
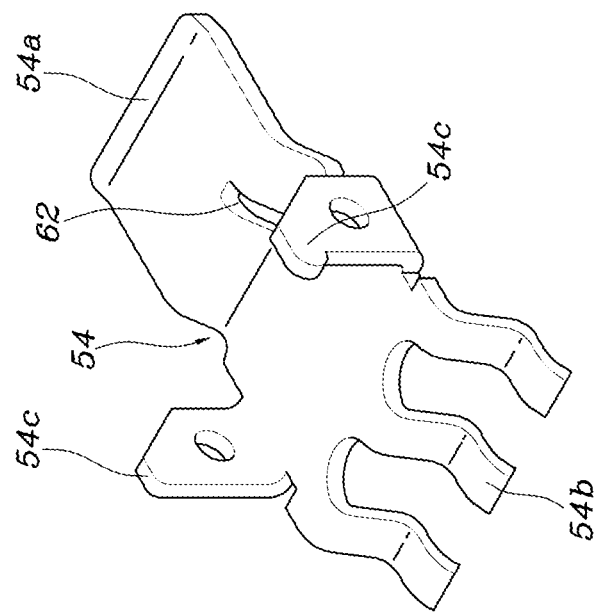
FIG. 9A is a perspective view illustrating a release lever according to the present disclosure.

As shown in FIGS. 5 to 9B, the seat rail for a vehicle according to the present disclosure extends in forward/rearward directions of a vehicle and includes a fixed rail 51 provided to be fixed to a floor panel in the vehicle and a moving rail 52 combined with the fixed rail 51 to slidably move along a longitudinal direction of the fixed rail 51.

Furthermore, the seat rail includes a locking apparatus so as to restrict movement of the moving rail 52 in the forward/rearward directions. As shown in the drawings, the manual type locking apparatus having a release lever and the locking pin includes a locking mounting bracket 53, the release lever 54, a lever shaft 55, a lever spring 56, the guide bracket 57, a plurality of locking pins 58, and one locking pin spring 59 provided per each of the locking pins 58.

The locking mounting bracket 53 is combined on an upper surface of the moving rail 52 so as to be fixed thereto and includes opposing bracket flanges 53a provided thereon when the locking mounting bracket 53 is combined with the moving rail 52, the bracket flanges protruding from an outer side of the moving rail 52 in a side direction thereof and being spaced apart from each other in the forward/rearward directions.

The release lever 54 is positioned between the bracket flanges 53a, wherein the lever shaft 55 passes through the opposing bracket flanges 53a and the release lever 54 in the forward/rearward directions so as to be integrally combined therewith, and the lever spring 56 is wound on the lever shaft 55, a first end of the lever spring 56 being supported by the locking mounting bracket 53 and a second end thereof being supported by the release lever 54. When the release lever 54 rotates relative to the lever shaft 55, the release lever 54 may be elastically rotated by an elastic force of the lever spring 56.

The lever shaft 55 is integrally combined with the bracket flanges 53a by passing through the bracket flanges 53a such that the lever shaft 55 does not move in the forward/backward and leftward/rightward directions during the manipulation of the release lever 54.

That is, each of the bracket flanges 53a includes a shaft hole 53b provided thereon through which the lever shaft 55 passes in the forward/rearward directions, an edge of the shaft hole being blocked by the bracket flange 53a so as not to communicate with an outside but does not include an open hole provided on the bracket flange unlike the conventional seat rail.

Accordingly, the lever shaft 55 includes a head part 55a having a diameter larger than the shaft hole 53b and a press part 55b provided on a first end and a second end thereof, respectively, such that the lever shaft 55 is integrally combined with the bracket flanges 53a. Accordingly, due to the combined structure, the lever shaft 55 cannot perform shaft rotation relative to the bracket flange 53a and move in the forward/rearward directions (arrow M11) and the leftward/rightward directions (arrow M12).

Accordingly, during the manipulation of the release lever 54, the shakings of the release lever 54 in the forward/rearward directions (arrow M11) and the leftward/rightward directions (arrow M12) are reduced, and due to the decrease of the shaking of the release lever 54, operability of the locking pin 58 is improved.

The release lever 54 includes a manipulation part 54a and an operation part 54b contacting with the locking pin 58. The manipulation part 54a protruding to an outer side of the seat rail relative to the lever shaft 55 is manipulated by a user. The operation part 54b passes through the moving rail 52, and an end portion of the operation part 54b is positioned in the moving rail 52, and contacts with the locking pin 58 so as to move the locking pin 58 during the manipulation of the manipulation part 54a.

When a user presses down the release lever 54, the lever spring 56 is compressed, and when the release lever 54 being pressed down is released, the release lever 54 is restored to an initial position thereof by a restoring force of the lever spring 56 as shown in FIGS. 5 to 8.

In addition, the release lever 54 includes lever flanges 54c provided on opposite side portions thereof in the forward/rearward directions, each of the lever flanges 54c being bent in an upward direction, wherein the lever flange 54c is positioned on an inner side surface of the bracket flange 53a so as to overlap with the bracket flange 53a, and the lever shaft 55 is integrally combined with the bracket flanges 53a by passing through the pair of bracket flanges 53a and the pair of the lever flanges 54c.

The lever flange 54c is configured to be positioned between the manipulation part 54a and the operation part 54b of the release lever 54, and when the release lever 54 is rotated in the restoring direction thereof by the elastic force of the lever spring 56, the lever flange 54c contacts with the locking mounting bracket 53 and the rotation of the release lever 54 stops.

That is, when a user presses down the release lever 54, the lever spring 56 is compressed, and when the release lever 54 being pressed down is released, the release lever 54 is restored to an initial position thereof by a restoring force of the lever spring 56, as shown in FIGS. 5 to 8. Accordingly, when the release lever 54 is rotated in the restoring direction thereof by the elastic force of the lever spring 56, the lever flange 54c contacts with the locking mounting bracket 53 and the rotation of the release lever 54 in the restoring direction stops.

Meanwhile, the moving rail 52 includes a window 61 provided on one side wall 52a thereof, and the operation part 54b of the release lever 54 is provided by passing through the window 61, whereby as mentioned above, when the release lever 54 is rotated in the restoring direction by the elastic force of the lever spring 56, the lever flange 54c contacts with the locking mounting bracket 53, and the rotation of the release lever 54 stops. In this case, the operation part 54b of the release lever 54 is positioned in the space between an upper surface 61a of the window 61 and a lower surface 61b thereof, which may considerably decrease operational noise compared to the conventional structure.

That is, according to the structure of the present disclosure, when the release lever 54 is rotated in the restoring direction by the elastic force of the lever spring 56, the lever flange 54c first contacts with the locking mounting bracket 53 and the restoring rotation of the release lever 54 stops before a lower surface of the operation part 54b of the release lever 54 contacts with the lower surface 61b of the window 61. Accordingly, when the lever flange 54c contacts with the locking mounting bracket 53, the operation part 54b of the release lever 54 is positioned in the space between the upper surface 61a of the window 61 and the lower surface 61b thereof.

According to the conventional structure, a lower surface of an operation part of a release lever contacts directly with a lower surface of a window and due to a wide contact area, loud operational noise occurs.

However, according to one form of the present disclosure, when the release lever 54 rotates to restore to an initial position thereof, the lever flanges 54c first contacts with the locking mounting bracket 53 and the rotation of the release lever 54 stops. Accordingly, the operation part 54b of the release lever 54 is positioned in a space between the upper surface 61a of the window 61 and the lower surface 61b thereof, whereby the lower surface of the operation part 54b of the release lever 54 is inhibited from contacting with the lower surface 61b of the window 61, which promotes reducing a contact area of the release lever and a reduction of operational noise.

The guide bracket 57 is an L-shaped bracket, a first end thereof being combined with an inner side surface of one side portion of the moving rail 52 so as to be fixed thereto and a second thereof being provided so as to pass through an inner space of the moving rail 52 in leftward/rightward directions of the seat rail.

The multiple locking pins 58 are arranged in a row in the forward/rearward directions, and each of the locking pins 58 is provided to integrally pass through the fixed rail 51, the guide bracket 57, the moving rail 52, and the locking mounting bracket 53 in a vertical direction and to move vertically. Opposite ends of the locking pin spring 59 are provided to be supported by the retainer 60 and a locking pin flange 58a.

The retainer 60 is provided on an inner side of the upper surface of the moving rail 52, and the locking pin flange 58a is provided to be integral to the locking pin 58.

Furthermore, according to the present disclosure, the release lever 54 includes an insertion hole 62 into which the second end of the lever spring 56 is inserted and a fixing hole 63 which the second end of the lever spring 56 is held in and fixed to, the insertion hole 62 and the fixing hole 63 being connected to each other by a connection hole 64. Particularly, a stop step 65 is provided between the insertion hole 62 and the fixing hole 63 so that the second end of the lever spring 56 held in the fixing hole 63 cannot move to the insertion hole 62.

The conventional release lever does not have a structure to which an end portion of a lever spring is held to be fixed. Accordingly, since the release lever cannot be stably provided by the lever spring, a shaking of the release lever increases during a manipulation of the release lever, and as the shaking of the release lever increases, operability of a locking pin deteriorates.

On the contrary, according to the structure of the present disclosure, the second end of the lever spring 56 is inserted into the insertion hole 62 (P1 of FIG. 9B) of the release lever 54 and the second end of the lever spring 56 inserted into the insertion hole 62 moves along the connection hole 64 (arrow M13), and finally, the second end of the lever spring 56 is held in and fixed to the fixing hole 63. Accordingly, the second end of the lever spring 56 positioned in the fixing hole 63 (P2 of FIG. 9B) is held by the stop step 65 and cannot move to the insertion hole 62.

Accordingly, according to the present disclosure, structures of the insertion hole 62, the connection hole 64, the fixing hole 63, and the stop step 65 provided on the release lever 54 are used to hold the second end of the lever spring 56 in the fixing hole 63. Accordingly, the release lever 54 may be stably provided by the lever spring 56, and during the manipulation of the release lever 54, the shaking of the release lever 54 may be reduced, which improves operability of the locking pin 58 by the release lever 54.

As described above, according to the present disclosure, the lever shaft 55 is integrally combined with the bracket flanges 53a, whereby during the manipulation of the release lever 54, the shaking of the release lever 54 in the forward/backward and leftward/rightward directions thereof may be reduced and due to the reduction of the shaking of the release lever 54, the operability of the locking pin 58 may be improved.

Furthermore, according to the seat rail of the present disclosure, when the release lever 54 rotates in the restoring direction thereof by the elastic force of the lever spring 56, the lever flange 54c first contacts with the locking mounting bracket 53 and the rotation of the release lever 54 stops. Accordingly, the operation part 54b of the release lever 54 is positioned in the space between the upper surface 61a of the window 61 and the lower surface 61b thereof, whereby the lower surface of the operation part 54b of the release lever 54 is inhibited from contacting with the lower surface 61b of the window 61, which promotes reducing the contact area of the release lever and the reduction of operational noise.

In addition, the present disclosure uses the structures of the insertion hole 62, the connection hole 64, the fixing hole 63, and the stop step 65 provided on the release lever 54 so as to hold the second end of the lever spring 56 in the fixing hole 63 to be fixed thereto, thereby allowing the release lever 54 to be stably installed due to the lever spring 56, reducing the shaking of the release lever 54 during manipulation of the release lever 54, and improving the operability of the locking pin 58 by the release lever 54.

It should be understood that the seat rail of the present disclosure has been described for illustrative purposes, and those skilled in the art will appreciate that various modifications, additions and substitutions are possible, without departing from the scope and spirit of the present disclosure as disclosed in the accompanying claims.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, manufacturing technology, and testing capability.

As used herein, the phrase at least one of A, B, and C should be construed to mean a logical (A OR B OR C), using a non-exclusive logical OR, and should not be construed to mean "at least one of A, at least one of B, and at least one of C.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A seat rail for a vehicle, the seat rail comprising:
a locking mounting bracket being fixed on a moving rail and having a pair of bracket flanges provided thereon, the bracket flanges being spaced apart from each other in forward/rearward directions of the vehicle; and
a release lever being combined with the pair of bracket flanges therebetween so as to be elastically rotated by a lever shaft and a lever spring,
wherein the lever shaft is integrally combined with each of the bracket flanges by passing through the bracket flanges such that the lever shaft cannot move in forward/backward and leftward/rightward directions during a manipulation of the release lever,
wherein the lever spring is combined with the lever shaft such that a first end and a second end of the lever spring are supported by the locking mounting bracket and the release lever, respectively when the lever spring is wound on the lever shaft, and
wherein the release lever includes
an insertion hole into which the second end of the lever spring is inserted,
and a fixing hole which the second end of the lever spring is held in and fixed to, the insertion hole and the fixing hole being connected to each other by a connection hole.

2. The seat rail of claim 1, wherein
the bracket flange includes a shaft hole provided thereon through which the lever shaft passes in the forward/rearward directions, an edge of the shaft hole being blocked by the bracket flange so as not to communicate with an outside, and
the lever shaft includes a head part having a diameter larger than the shaft hole and a press part provided on a first end and a second end thereof, respectively such that the lever shaft is integrally combined with the bracket flanges.

3. The seat rail of claim 1, wherein
the release lever includes lever flanges provided on opposite side portions thereof in the forward/rearward directions, each of the lever flanges being bent in an upward direction, wherein the lever flange is positioned on an inner side surface of the bracket flange so as to overlap with the bracket flange,
the lever shaft is integrally combined with the bracket flanges by passing through the pair of bracket flanges and the pair of the lever flanges;
and
the release lever is combined with the lever shaft so as to elastically rotate relative to the lever shaft.

4. The seat rail of claim 3, wherein
the lever flange is positioned between a manipulation part and an operation part of the release lever, and when the release lever is rotated in a restoring direction thereof by an elastic force of the lever spring, the lever flange contacts with the locking mounting bracket and rotation of the release lever stops.

5. The seat rail of claim 4, wherein
the moving rail includes a window provided on one side wall thereof, and
the operation part of the release lever is provided by passing through the window,
wherein when the lever flange stops the rotation thereof by contacting with the locking mounting bracket, the operation part of the release lever is positioned in a space between an upper surface of the window and a lower surface thereof.

6. The seat rail of claim 1, wherein a stop step is provided between the insertion hole and the fixing hole so that the second end of the lever spring held in the fixing hole cannot move to the insertion hole.

* * * * *